United States Patent [19]

Turlakov et al.

[11] Patent Number: 4,831,514
[45] Date of Patent: May 16, 1989

[54] METHOD AND DEVICE FOR CONNECTING A 16-BIT MICROPROCESSOR TO 8-BIT MODULES

[75] Inventors: Hristo A. Turlakov; Stefan S. Machev; Venelin G. Barbutov, all of Sofia, Bulgaria

[73] Assignee: DSO "IZOT", Sofia, Bulgaria

[21] Appl. No.: 84,593

[22] Filed: Aug. 10, 1987

Related U.S. Application Data

[63] Continuation-in-part of Ser. No. 829,753, Feb. 14, 1986, abandoned.

[51] Int. Cl.⁴ .................... G06F 13/00; G06F 11/00
[52] U.S. Cl. .................................. 364/200; 364/900
[58] Field of Search ... 364/200 MS File, 900 MS File

[56] References Cited

U.S. PATENT DOCUMENTS

| | | | |
|---|---|---|---|
| 4,213,177 | 7/1980 | Schmidt | 364/200 |
| 4,443,846 | 4/1984 | Adcock | 364/200 |
| 4,443,864 | 4/1984 | McElroy | 364/900 |
| 4,447,878 | 5/1984 | Kinnie et al. | 364/200 |
| 4,590,556 | 5/1986 | Berger et al. | 364/200 |

FOREIGN PATENT DOCUMENTS 3614612 10/1986 Fed. Rep. of Germany .
0011873 1/1986 Japan .

OTHER PUBLICATIONS

Walter A. Triebel, "16-Bit Microprocessors", 1986, Prentice-Hall, Inc., pp. 128-131, 139-143, 146-153, 212-215, 310-321, 335-339.
Russell Rector, "The 8086 Book", 1985, Osborn/McGraw-Hill, pp. 9-11 to 9-13.

*Primary Examiner*—Gareth D. Shaw
*Assistant Examiner*—Viet Q. Nguyen
*Attorney, Agent, or Firm*—Klein & Vibber

[57] ABSTRACT

A method and apparatus for connecting a 16 bit microprocessor to an 8-bit device such as a memory device permits full 16-bit (2-byte) words to be exchanged to or from the 16-bit microprocessor through a series of buffers controlled by a control circuit which is driven by the microprocessor. The method and apparatus puts the microprocessor in a wait state with strictly defined duration when reading a first byte from an 8-bit device, a control circuit stores it in a buffer register, modifies the read address of the 8-bit device, and then sends the stored first byte together with a second byte read from the 8-bit device to the microprocessor simultaneously. This arrangement makes the 8-bit device appear like a 16-bit device to the microprocessor. When writing to the 8-bit device, two bytes are simultaneously taken from the microprocessor, one going directly to the 8-bit device and the other going to a buffer. The microprocessor is placed in a wait state with strictly defined duration, the address of the 8-bit device is modified, and then the second stored byte is sent to the 8-bit device. Thus, in both read and write operations, the 8-bit device is made to "look like" a 16-bit device for the microprocessor.

13 Claims, 4 Drawing Sheets

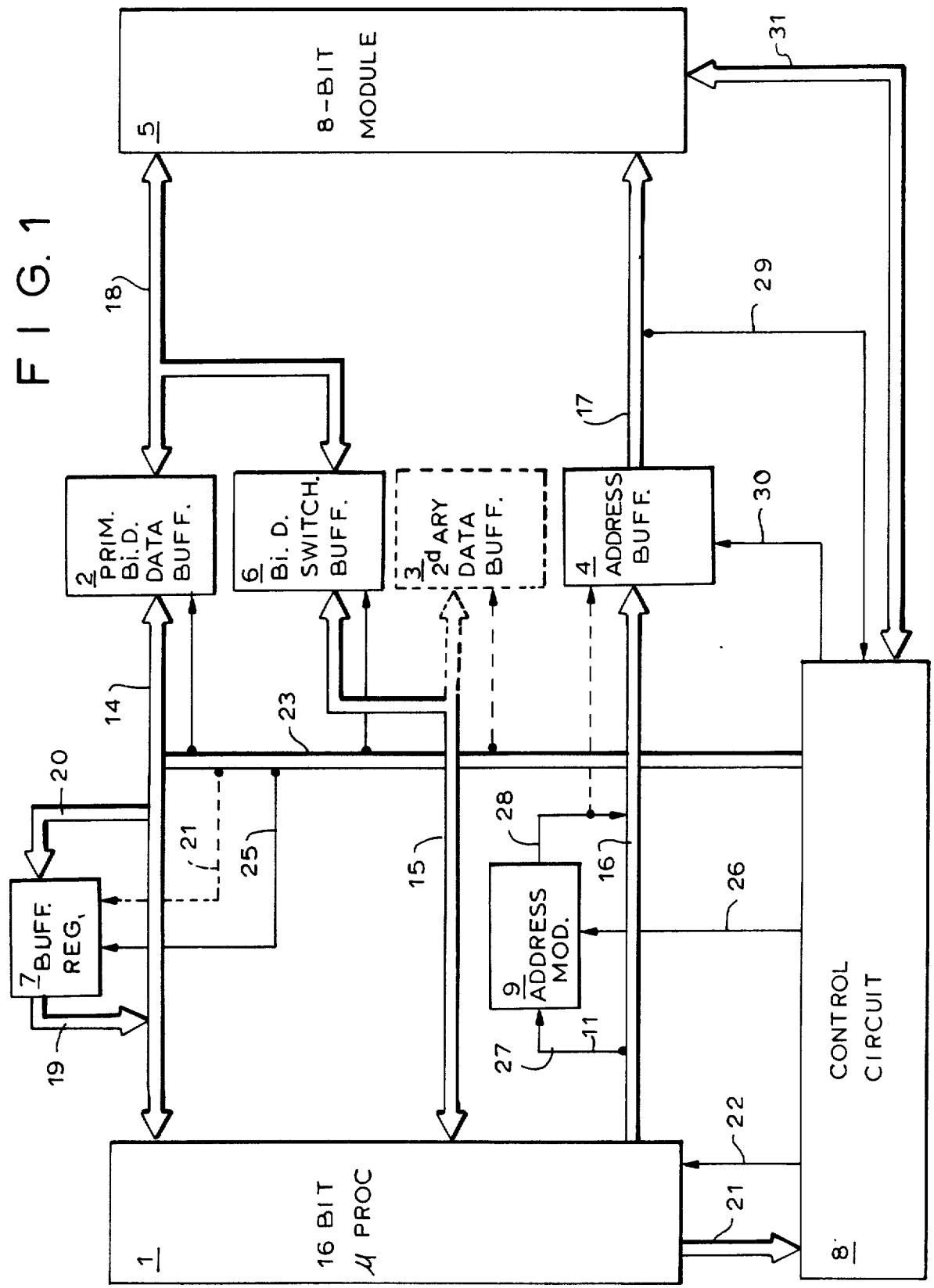
F I G. 1

F I G. 3
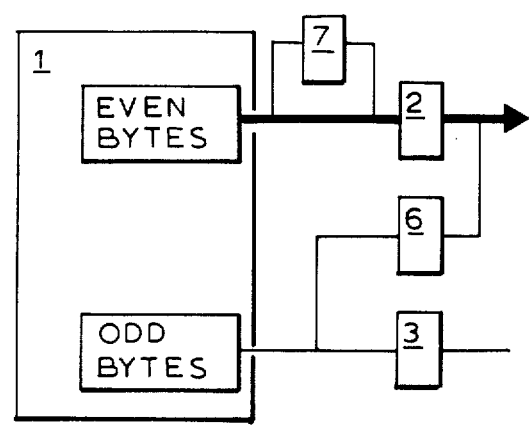
a) WRITE BYTE OPERATION
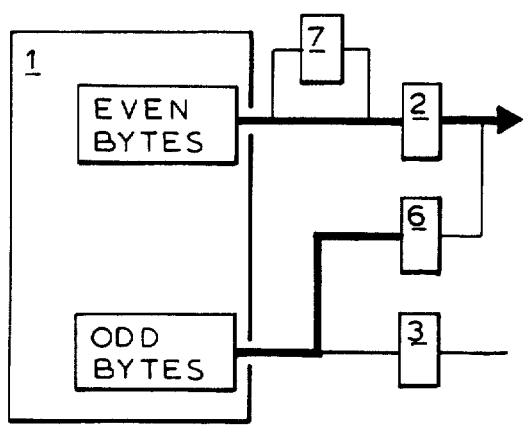
FIRST HIDDEN WRITE EXCHANGE OPERATION
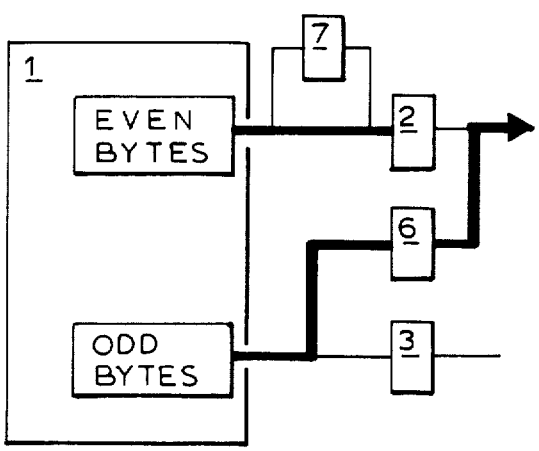
SECOND, HIDDEN WRITE EXCHANGE OPERATION
b) WRITE WORD OPERATION a) READ BYTE OPERATION

FIRST, HIDDEN READ EXCHANGE OPERATION

SECOND, HIDDEN READ EXCHANGE OPERATION b) READ WORD OPERATION

METHOD AND DEVICE FOR CONNECTING A 16-BIT MICROPROCESSOR TO 8-BIT MODULES

This application is a continuation-in-part of our co-pending application Ser. No. 829,753 filed Feb. 14, 1986, now abandoned. This application is also related to our copending application Ser. No. 829,756 filed Feb. 14, 1986, the complete disclosure of which is incorporated herein by reference. This application is further related to U.S. Pat. No. 4,447,878, the disclosure of which is also incorporated herein by reference.

BACKGROUND OF THE INVENTION

This invention relates to a method and a device for connecting a 16-bit microprocessor to 8-bit modules, finding application in 16-bit computers and microprocessor systems.

There is a well-known method for connecting a 16-bit bus to an 8-bit bus (U.S. Pat. No. 4,447,878) wherein the 16-bit bus exchanges with the 8-bit bus one byte for each exchange operation, and in the beginning of the operation, the 16-bit bus sets the address and the exchange control signals to the 8-bit bus which fixes the state of the 16-bit bus when the access time is longer than the duration of the exchange operation and where the 16-bit bus, if required to exchange one word (two bytes) to the 8-bit bus, performs two subsequent byte exchange instructions, which effect two one-byte exchange operations.

It is a disadvantage of the known method that the portion of exchanged information between the 16-bit bus and the 8-bit bus by one exchange operation is restricted by the number of digits of the 8-bit bus and not by the 16-bit bus. Another disadvantage of the known method is the low exchange speed between the 16-bit bus and the 8-bit bus. The known method actually makes the 16-bit bus behave like a "pseudo 8-bit bus", rather than making the 8-bit bus behave like a "pseudo 16-bit bus".

U.S. Pat. No. 4,447,878 also discloses a device for connecting 16-bit modules to both 8-bit and 16-bit microprocessors, wherein the primary data bus of the 16-bit modules are connected to the module's side of data port of a primary bidirectional data buffer and the secondary data bus are connected to the module's side of data bus of a secondary bidirectional data buffer. The address outputs of the 16-bit and 8-bit microprocessors are connected to the inputs of a unidirectional address buffer, the outputs of which are connected to the address inputs of the 16-bit modules. The secondary data bus of the 16-bit modules are connected to the module's side of data bus of a bidirectional swap data buffer, the microprocessor's side of data bus of which is connected to the primary data bus of the 16-bit microprocessor.

Byte exchanges from the 16 bit microprocessor to the 16 bit module occur as follows: In the case of a byte exchange operation on an even address, the 16-bit microprocessor primary data bus are directly coupled to the 16-bit module's primary bus by means of the primary bidirectional data buffer. In the case of a byte exchange operation of an odd address, the 16-bit microprocessor secondary data bus are connected to the 16-bit module's secondary data bus by means of the secondary bidirectional data buffer.

Byte exchanges from the 8 bit microprocessor to the 16 bit module occur as follows: In the case of a byte exchange operation of an odd address, the 8-bit microprocessor data bus are connected to the 16-bit modules secondary data bus by means of the bidirectional swap data buffer.

In word exchange operations, the 16-bit microprocessor primary data bus are coupled by means of the primary bidirectional data buffer to the 16-bit module's primary data bus, and the 16-bit microprocessor secondary data bus are connected by means of the secondary bidirectional data buffer to the 16-bit module's secondary data bus.

It is a disadvantage of the known device that, in word and byte exchange operations, if 8-bit modules are used in the system their data bus must be evenly connected to the 16-bit microprocessor primary or secondary data bus, which is, in fact, a firm connection of the 8-bit modules to addresses on either the even or the odd boundary, because the bidirectional switching data buffer is not activated. A change of the 16-bit microprocessor software is required to surmount the limitations appearing in the case of word exchange.

It is a further disadvantage both of the known method and the known device that they contain a limitation for the utilization only of data byte operations with the 8-bit modules of the 16-bit microprocessor system.

Thus, the prior art does not teach any specific method or means for connecting a 16-bit microprocessor with an 8-bit memory, for example, where the 8-bit memory is made to appear like a 16-bit memory to the 16-bit microprocessor. On the contrary, the known methods and devices all make the 16-bit microprocessor behave like an 8-bit microprocessor when dealing with 8-bit memory devices.

SUMMARY OF THE INVENTION

It is an object of this invention to establish a method and a device for connecting a 16-bit microprocessor to 8-bit modules (such as memory devices) or slave input-output devices which enables the performance not only of byte exchange operations but also word (two bytes) exchange operations at a higher speed and with simplified software for the 16-bit microprocessor, using the available circuits of functionally compatible 8-bit modules.

This object is achieved by a method for connecting a 16-bit microprocessor to 8-bit modules, wherein the 16-bit microprocessor, in word (two byte) operations, sets the address and activates twin-cycle byte exchange signals and sets the exchange control signals to the 8-bit modules. A control circuit connects the 8-bit module data bus to the primary data bus of the 16-bit microprocessor via a primary data buffer, sets the 16-bit microprocessor to the wait state periods equal to the number of periods required for performance of one byte exchange operations with an 8-bit module, by means of which the control circuit executes two hidden byte exchange operations (hidden from the 16-bit microprocessor) with the 8-bit module. At the end of the first, hidden byte exchange operation, the address is modified, preparations are performed for the commencement of the second hidden byte exchange operation, and the 8-bit module data bus are switched to the secondary bus of the 16-bit microprocessor. At the end of the first, hidden byte exchange operation of a word reading operation, performed by the 16-bit microprocessor, the first data byte, read from the 8-bit module is stored in a buffer register via the primary data buffer, before the address modification. At the beginning of the second, hidden byte, exchange operation the 16-bit microprocessor is taken out of the wait state and the performance of the second, hidden byte, exchange operation and respectively the whole, 16-bit microprocessor driven, word exchange operation are completed. At the end of the second, hidden byte exchange operation of a word reading operation, performed by the 16-bit microprocessor, the first data byte, read from the 8-bit module and stored in a buffer register, is sent to the primary data bus of the 16-bit microprocessor and the second data byte, read from the 8-bit module directly, is sent via a switching data buffer to the secondary data bus of the 16-bit microprocessor. Extra wait periods are entered when the time for execution of the data exchange with an 8-bit module is greater than the time for execution of the exchange operation. Thus, the 8-bit module is made to appear like a 16-bit module for the 16-bit microprocessor.

This object is also achieved by means of a device for connecting a 16-bit microprocessor to 8-bit modules, wherein the 16-bit microprocessor primary data bus are connected to the microprocessor's side of data port of a primary bidirectional data buffer and the 16-bit microprocessor secondary data bus are connected to the microprocessor's side of data port of a secondary bidirectional data buffer. The 16-bit microprocessor address bus is coupled to the address inputs of a unidirectional address buffer, the outputs of which are connected to the 8-bit module's address inputs. The 8-bit modules data bus is connected to the module's side of data port of the primary bidirectional data buffer and the module's side of data port of the bidirectional switching data buffer, the microprocessor's side of data port of which are connected to the 16-bit microprocessor secondary data bus.

The 16-bit microprocessor primary data bus is also connected to the data outputs of a buffer register, the data inputs of which are connected to the microprocessor's side of data port of the primary bidirectional data buffer. The 16-bit microprocessor control outputs are connected to the twin-cycle byte exchange inputs of a control circuit, the wait periods setting output signal of which is connected to the 16-bit microprocessor control input. The data buffers control outputs of the control circuit are connected to the control inputs of the primary bidirectional data buffer, the bidirectional switching data buffer, the buffer register and the secondary bidirectional data buffer. The control circuit address modification control output is connected to the control input of an address modification circuit, the address input of which is connected to the 16-bit microprocessor least significant address bit, and the address bit thereof to the least significant address input of the unidirectional address buffer. The unidirectional address buffer least significant address bit is connected to the control circuit address control input, the address buffer control output of which is connected to the unidirectional address buffer control input, and the control circuit control interface bus being connected to the 8-bit module's control interface bus.

The control circuit includes a twin-cycle byte exchange control unit, a data buffer control unit, a wait periods setting unit and an address circuit control unit. The wait control output of the twin-cycle exchange control unit is connected to the control input of the wait periods setting unit. The buffer enable outputs of the twin-cycle byte exchange control unit are connected to the control inputs of the data buffer control unit. The modification control output of the twin-cycle byte exchange control unit is connected to the control input of the address circuit control unit. The twin-cycle byte exchange control unit control inputs are the twin-cycle byte exchange control inputs of the control circuit and its bus is connected to the control circuit control interface bus. The wait periods setting unit output signal is coupled to the wait periods setting output signal of the control circuit. The data buffers control unit outputs are connected to the data buffers control outputs of the control circuit. The two address circuit control unit outputs are connected respectively to the address modification control output and to the address buffer control output of the control circuit.

It is an advantage of this invention that it guarantees the connection of 8-bit modules to the 16-bit microprocessor ensuring the performance of both byte exchange operations and word (two-bytes) exchange operations with the 8-bit modules. Furthermore, no changes are demanded either in the circuits of the functionally compatible 8-bit modules or in the software of the 16-bit microprocessor.

Another advantage of the invention is that when the 16-bit microprocessor exchanges a word (two bytes) with 8-bit modules it performs a word exchange instruction instead of two bytes exchange instructions and for the time of execution of the two, control circuit driven, byte exchange operations, the 16-bit microprocessor executes one word exchange operations. This results in higher speed data exchanges between the 16-bit microprocessor and the 8-bit modules and in simplification of the system software.

BRIEF DESCRIPTION OF THE DRAWINGS

With these and other objects in view, which will become apparent in the following detailed description, the present invention, which is shown by example only, will be clearly understood in connection with the accompanying drawing, in which:

FIG. 1 is a block diagram of the device for connecting a 16-bit microprocessor to 8-bit modules;

FIG. 3 is a diagram of how byte and word write operations are performed by the 16-bit microprocessor on the 8-bit module.

DESCRIPTION OF THE PREFERRED EMBODIMENTS

Figure 2:
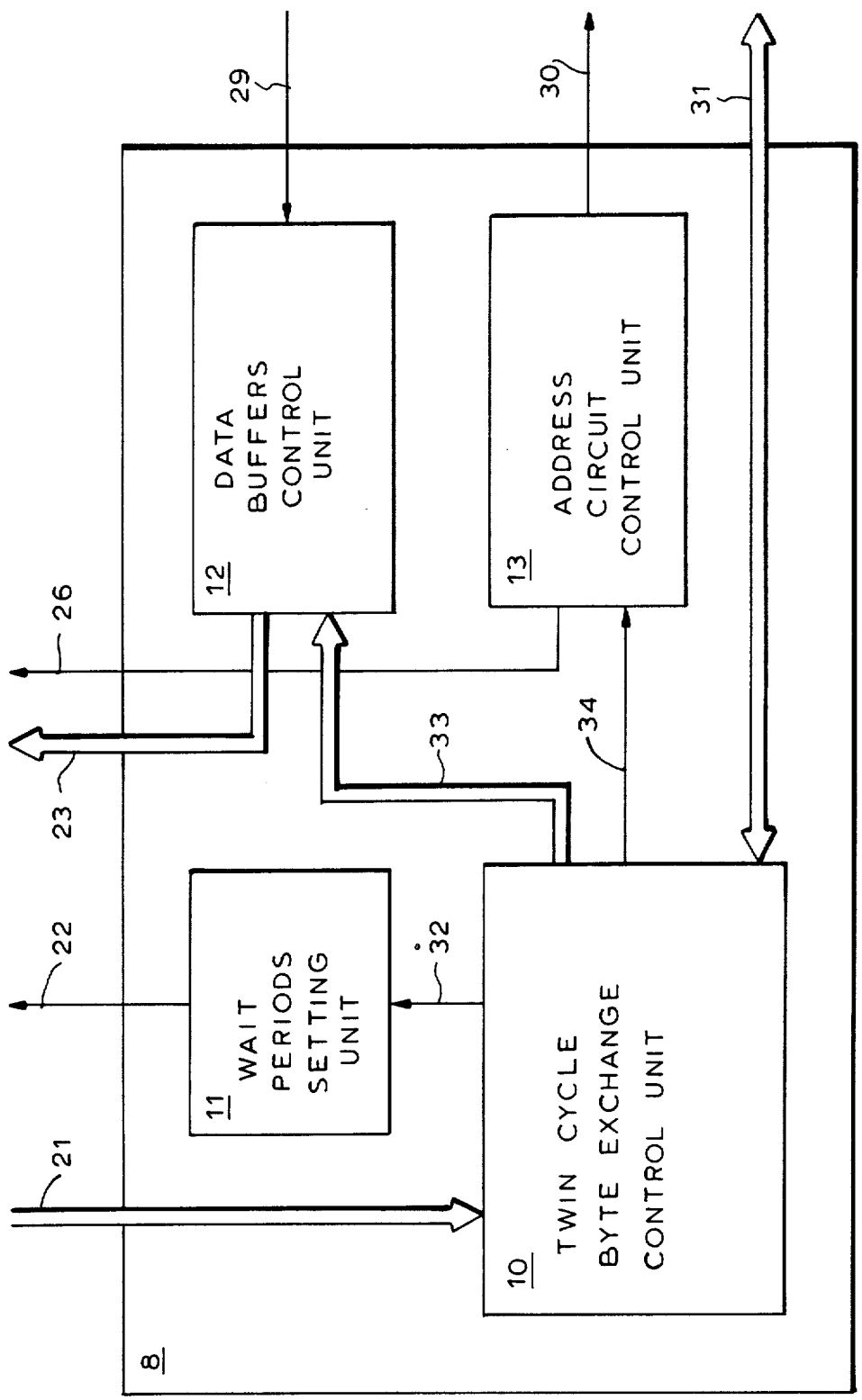
FIG. 2 is a block diagram of the control circuit in the device of FIG. 1.

Referring to FIG. 1, in the device for connecting a 16-bit microprocessor to 8-bit modules, primary data bus 14 of a 16-bit microprocessor 1 is connected to the microprocessor's side of the data port of a primary bidirectional data buffer 2 and the secondary data bus 15 of the 16-bit microprocessor 1 is connected to the microprocessor's side of the data port of a secondary bidirectional data buffer 3.

The address bus 16 of the 16-bit microprocessor 1 are coupled to the address inputs of a unidirectional address buffer 4, the outputs of which are connected to the address inputs 17 of the 8-bit modules 5. The data bus 18 of the 8-bit modules 5 is connected to the module's side of the data port of the primary bidirectional data buffer 2 and the module's side of the data port of the bidirectional switching data buffer 6, the microprocessor's side of the data port of which is connected to the secondary data bus 15 of the 16-bit microprocessor 1.

The primary data bus 14 of the 16-bit microprocessor 1 are also connected to the data outputs 19 of a buffer register 7, the data inputs 20 of which are connected to the microprocessor's side of the data port of the primary bidirectional data buffer 2. Control outputs of the 16-bit microprocessor 1 are connected to the twin-cycle byte exchange inputs 21 of a control circuit 8, a wait period setting output signal 22 of which is connected to a control input of the 16-bit microprocessor 1. The control outputs 23 of the control circuit 8 are connected to the control inputs of the primary bidirectional data buffer 2, the bidirectional switching data buffer 6, the secondary bidirectional data buffer 3 and to the buffer register 7 strobe input 24 and enable output 25.

The control circuit 8 address modification control output 26 is connected to the control input of an address modification circuit 9, an address input 27 of which is connected to the least significant address bit of the 16-bit microprocessor 1, and an address output 28 thereof to the least significant address input of the unidirectional address buffer 4. The least significant address bit of the unidirectional address buffer 4 is connected to the address control input line 29 of the control circuit 8. The address buffer control output line 30 of the control circuit 8 is connected to the unidirectional address buffer 4 control input, and the control circuit 8 control interface signals are connected to the 8-bit modules 5 control interface input-output signals 31.

Referring now to FIG. 2, the control circuit 8 includes a twin-cycle byte exchange control unit 10, a wait periods setting unit 11, a data buffer control unit 12 and an address circuit control unit 13. The wait period output line 32 of the twin-cycle exchange control unit 10 is connected to the control input of the wait periods setting unit 11. The buffer enable outputs signal 33 of the twin-cycle byte exchange control unit 10 are connected to the control inputs of the data buffers control unit 12. The modification control output line 34 of the twin-cycle byte exchange control unit 10 is connected to the control input of the address circuit control unit 13.

The control inputs of the twin-cycle byte exchange control unit 10 serve as the twin-cycle byte exchange control inputs 21 of the control circuit 8 and its inputs-outputs serve as the control circuit 8 control interface inputs-outputs 31. The wait periods setting unit 11 output serves as the wait periods setting output line 22 of the control circuit 8, and the data buffers control unit 12 outputs serve as the data buffers control outputs 23 of the control circuit 8. The two outputs of the address circuit control unit 13 serve as the address modification control output signal 26 and the address buffer control output 30 of the control circuit 8.

It is convenient to place the buffer organization and control circuit on the microprocessor board rather than on the memory board, since the control circuit monitors the 16-bit microprocessor and works synchronously with it. The connection 21 in FIG. 1 (the twin-cycle byte exchange control inputs) comprises the inputs for the type of exchange operation. For example, if the 16-bit microprocessor is an Intel 8086 (8086 plus bus controller 8288 and clock generator 8284), the twin-cycle byte exchange control inputs comprise the microprocessor address outputs −BHE and DA0, the microprocessor status outputs −S0, −S1, −S2, and the 8288 control outputs ALE and DT/−R. −BHE and DA0 define the type of exchange operation (byte or word). −S0, −S1, −S2 define the type of operation (read or write). The value of −BHE, DA0, −S0, −S1, and −S2 is latched in the twin-cycle byte exchange control unit 10 on the falling edge of ALE.

If the microprocessor is a Motorola MC 68000, the connection 21 comprises asynchronous control outputs R/−W, −UDS, LDS and −AS. The value of asynchronous outputs −UDS and −LDS is valid when the microprocessor asserts the address strobe −AS. In this case, the microprocessor 1 in FIG. 1 would comprise only the MC 68000 microprocessor.

The twin-cycle byte exchange control unit 10 (shown in FIG. 2) is a simple state machine which controls the hidden byte exchange cycles. Its exact structure depends on the type of microprocessor used.

The connection line 22 in FIG. 2 (wait periods setting output signal) operates in two ways: first, when there is need to perform a word exchange with an 8-bit module, and second when the 8-bit device is a slow one. The first mentioned operation is generated by the twin-cycle byte exchange control unit 10 the duration of which is equal to the duration of a byte exchange operation. The second mentioned operation is generated by the 8-bit device 5, by means of its control interface bus 31, which can indicate a need for extra wait states because the device is a slow one. The activation of the connection line 22 is actually a reaction of the activation of the wait control output 32 of the twin-cycle byte exchange control unit 10. Thus the two mentioned operations are consolidated by the twin-cycle byte exchange control unit 10.

Method of Operation

The device described above for connecting a 16-bit microprocessor to 8-bit modules operates in accordance with the following method:

The twin-cycle byte exchange control unit 10 analyzes the state of the, 16-bit microprocessor 1 driven, twin-cycle byte exchange inputs 21 of the control circuit 8 and recognizes the type of exchange operation (bytes or word exchange, read, or write). For byte exchange operations, the wait periods setting unit 11 activates its wait periods setting output signal 22 only when the data exchange is with a slow 8-bit module. The address circuit control unit 13 is not activated and the address, fed from the address bus 16 of the 16-bit microprocessor 1, is transmitted, without change, through the unidirectional address buffer 4 to the address inputs 17 of the 8-bit modules 5. The address modification circuit 9 makes no active operations. The control circuit 8 repeats the operation and the control interface inputs 29 of the 8-bit modules 5 are driven, in fact, by the 16-bit microprocessor 1.

The data buffers control unit 12 controls the primary bidirectional data buffer 2, the bidirectional switching data buffer 6 and secondary bidirectional data buffer 3. When the byte address is even, the data bus 18 of the 8-bid module 5 are connected to the primary data bus 14 of the 16-bit microprocessor 1 by means of the primary bidirectional data buffer 2. When the byte address is odd, the data bus 18 of the 8-bit module 5 is connected to the secondary data bus 15 of the 16-bit microprocessor 1 by means of the bidirectional switching data buffer 6.

The twin-cycle byte exchange control unit 10 analyzes the control interface outputs 31 of the 8-bit module 5 and when it recognizes the condition of a slow device, activates its wait control output 32 and forces the wait periods setting unit 11 to activate its output. As a result, the control circuit 8 activates its wait periods setting output signal 22 and sets the 16-bit microprocessor 1 in wait state for so many periods as are required by the slow 8-bit module 5.

In word instructions, demanding word exchange operations, the twin-cycle byte exchange control unit 10 extends the word operation by activating the wait periods setting unit 11, which sets the 16-bit microprocessor 1 into a wait state. This continues for as many periods as are required for performance of two hidden byte exchange operations. In other words, the wait state is equal to the duration of a byte transfer operation. For example, if the 16-bit microprocessor is an I 8086 or NS 16032, the duration of a byte transfer operation is 4 clock periods and the duration of the wait state in word exchange operations is 4 clock periods. Simultaneously, the conditions are analyzed for setting extra wait periods, required by a slow 8-bit module 5 for execution of a single byte exchange operation.

The twin-cycle byte exchange control unit 10 performs two hidden byte exchange operations in the direction set by the supplied, 16-bit microprocessor 1 driven, word operation by means of the data buffers control unit 12 and the address circuit control unit 13.

In the first hidden byte exchange operation, the address fed from the 16-bit microprocessor 1 address outputs 16 is transmitted, without change, through the unidirectional address buffer 4 to the address inputs 17 of the 8-bit modules 5. The twin-cycle byte exchange unit 10 activates the 8-bit modules 5 control interface inputs 31.

In case of a write operation, the data buffers control unit 12 secures the sending of the byte at the 16-bit microprocessor 1 primary data outputs to the data inputs 18 of the 8-bit module 5 through the primary bidirectional data buffer 2.

In case of a read operation, the data buffer control unit 12 secures the storing of the data byte received from the 8-bit modules 5 in the buffer register 7 after having passed through the primary bidirectional data buffer 2. The buffer register is a three-state register with a common strobe input 24.

At the end of the first hidden byte exchange operation, the twin-cycle byte exchange unit 10 deactivates the 8-bit modules 5 control interface inputs 31. The address circuit unit 13 activates its address modification control output 26 and the address modification circuit 9 modifies the least significant 16-bit microprocessor 1 address output 27, which guarantees the selection and servicing of the next cell of 8-bit module 5. The modified address 28 is fed through the unidirectional address buffer 4 to the address inputs 17 of the 8-bit module 5. The 16-bit microprocessor 1 is still in wait state.

The second, hidden byte exchange operation is fully controlled by the twin-cycle byte exchange control unit 10, which again activates the control interface inputs 31 and analyzes the control outputs 31 of the 8-bit module 5.

In case of a write operation, the data buffer control unit 12 secures the sending of the byte which is on the 16-bit microprocessor 1 secondary data bus 15 to the 8-bit module 5 data inputs 18 through the bidirectional switching data buffer 6.

In case of a read operation, the data buffers control unit 12 guarantees the receiving of the byte at the 8-bit modules 5 data outputs 18 on the secondary data bus 15 of the 16-bit microprocessor 1 through the bidirectional switching data buffer 6. Simultaneously, the buffer register issues the data byte, stored in it during the first hidden read operation. to the primary data bus 14 of the 16-bit microprocessor 1.

Thus, at the end of the second hidden exchange operation, the 16-bit microprocessor 1, after being taken out from the wait state by deactivating the wait periods setting unit 11 output signal 22, can read or write a word (two bytes). The control circuit 8 guarantees the strict observance of the time schedule and the time limitations characterisitc for the exchange operation between the 16-bit microprocessor 1 and the 8-bit modules 5. For the 16-bit microprocessor, the transfer of word data to or from the 8-bit modules 5 is done by means of a word exchange operation, that is the 8-bit modules 5, by means of the control circuit 8, become pseudo-16-bit. For the 8-bit modules 5, the transfer of word data to or from the 16-bit microprocessor 1 is done by means of two hidden byte exchange operations, driven by the control circuit 8, which helps the 16-bit microprocessor 1 to look like an 8-bit microprocessor for the 8-bit modules 5.

FIG. 3 shows the sequence of write operations for both byte and word transfers from the 16-bit microprocessor to the 8-bit module. The top two drawings on FIG. 3 show individual odd and even byte exchanges. The bottom two drawings on figure 3 show the sequence of a full word write operation: two bytes leaving the microprocessor, the even byte going directly to the module and the odd byte going to buffer 6, then the odd byte being retrieved from buffer 6 to the 8-bit module.

Figure 4:
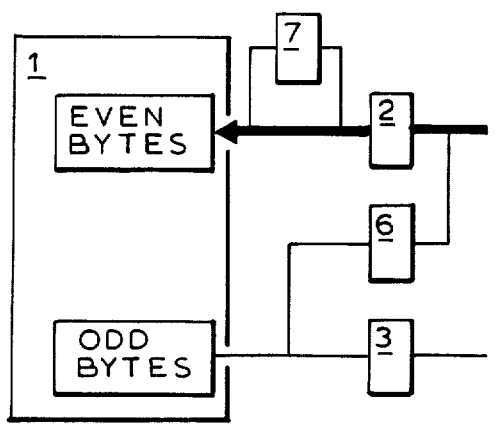
FIG. 4 is a diagram of how byte and word read operations are performed by the 16-bit microprocessor on the 8-bit module.
Figure 4:
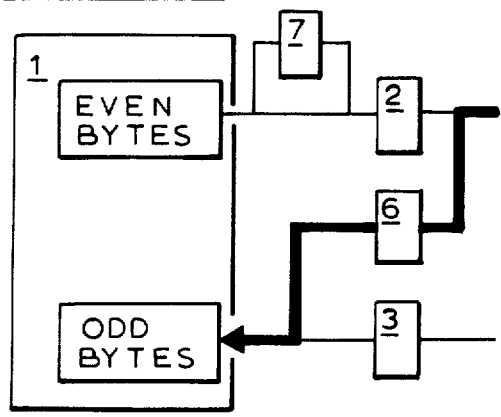
Figure 4:
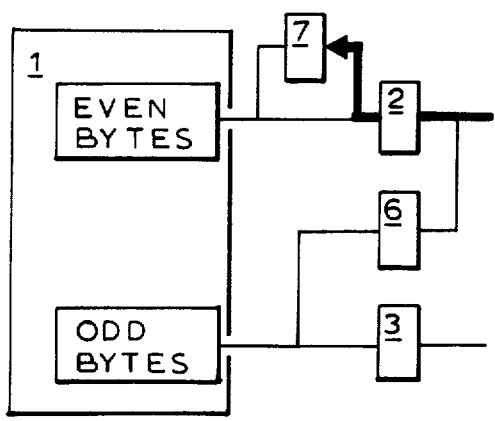
Figure 4:
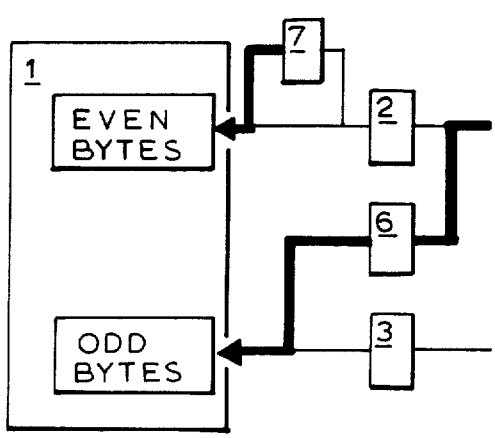

FIG. 4 shows the sequence of read operations for both byte and word transfers from the 16-bit microprocessor to the 8-bit module. The top two drawings on FIG. 4 show individual odd and even byte exchanges. The bottom two drawings on FIG. 4 show the sequence of a full word read operation: the first byte leaving the module is stored in buffer register 7, when the second byte is ready from the module, both bytes are sent simultaneously to the microprocessor, one from the buffer and the other directly from the module.

We claim:

1. A method for bidirectional word data exchange operation between a 16-bit microprocessor having a primary data bus and a secondary data bus and an 8-bit module having a single data bus, whereby said microprocessor can read and write to said module, comprising the steps of:

the 16-bit microprocessor begins the word data exchange operation by sending an address and a twin-cycle byte exchange control signal to a control circuit, the control circuit sending the exchange control signal to the 8-bit module, the control circuit connecting the 8-bit module data bus to the primary data bus of the 16-bit microprocessor via a primary data buffer, the control circuit putting the 16-bit microprocessor into a wait state equal to a number of periods required for a byte exchange operation, the control circuit executing two hidden byte exchange operations with the 8-bit module, the control circuit modifying the least significant bit of said address at the end of the first hidden byte exchange operation, the control circuit deactivating the exchange control signal, the control circuit disconnecting the 8-bit module data bus from the microprocessor primary data bus at the end of the first hidden byte exchange operation, the control circuit activating the exchange control signal for the second hidden byte exchange operation, the control circuit connecting the 8-bit module data bus to the secondary data bus of the 16-bit microprocessor via the switching data buffer at the beginning of the second hidden byte exchange operation, the control circuit taking the microprocessor out of the wait state at the beginning of the second hidden byte exchange operation, the microprocessor completing the second hidden byte exchange operation and respectively the entire word operation, the microprocessor deactivating the address and byte exchange control signal, the control circuit deactivating the exchange control signal, in the case of read word operation, the control circuit storing the first byte read from the 8-bit module in a buffer register before the address modification, simultaneously enabling the buffer register and the switching data buffer at the end of the operation, sending the first byte stored in the buffer register to the primary data bus of the microprocessor and the second byte via the switching data buffer to the secondary data bus directly from said 8-bit module.

2. A device for bidirectional word data exchange operation between a 16-bit microprocessor having a primary data bus and a secondary data bus and an 8-bit memory or slave input/output module having a single data bus, whereby said microprocessor can read from and write to said module, comprising:

a primary bidirectional data buffer, having data inputs and outputs, connected between the primary data bus of the 16-bit microprocessor and the data bus of the 8-bit module;

a secondary bidirectional data buffer, having data inputs and outputs, connected to the secondary data bus of the 16-bit microprocessor;

a bidirectional switching data buffer means, having data inputs and outputs, connected between the data bus of the 8-bit module and the secondary data bus of the 16-bit microprocessor;

a buffer register means for storing a first data byte read from the 8-bit module after a first byte exchange operation of a word operation, performed by the 16-bit microprocessor, an address modification circuit means for modifying the least significant address bit of the 8-bit module during a second byte exchange operation of a word operation, performed by the 16-bit microprocessor;

a control circuit means operatively connected to said 16-bit microprocessor, said data buffers, buffer register, said address modification circuit means and said 8-bit module, for driving said first and second byte exchange operations of a word operation, performed by the 16-bit microprocessor.

3. The device of claim 2 wherein said bidirectional switching data buffer means and buffer register means are concurrently enabled during a word operation, performed by the 16-bit microprocessor.

4. The device of claim 2 wherein said primary bidirectional data buffer and bidirectional switching data buffer are consecutively enabled during an word operation, performed by the 16-bit microprocessor.

5. The device of claim 2 wherein said buffer register means is operatively connected to the primary data bus of the 16-bit microprocessor.

6. The device of claim 2 wherein said address modification circuit means has an address input coupled to a least significant address bit of the 16-bit microprocessor and an address output coupled to a least significant address bit of a unidirectional address buffer.

7. The device of claim 2 wherein said address modification circuit means modifies the least significant address bit of the 16-bit microprocessor at the end of the first byte exchange operation of a word exchange operation, performed by the 16-bit microprocessor.

8. The device of claim 2 wherein said control circuit means comprises twin-cycle byte exchange inputs connected to control outputs of said 16-bit microprocessor, a wait periods setting output connected to a control input of said 16-bit microprocessor, data buffers control outputs connected, respectively, to control inputs of the primary bidirectional data buffer, the bidirectional switching data buffer, the secondary bidirectional data buffer and to a strobe input and enable input of the buffer register, an address modification control output connected to a control input of the address modification circuit, an address control input coupled to a least significant address bit of the unidirectional address buffer, an address buffer control output connected to a control input of the unidirectional address buffer and inputs-outputs coupled to the control interface bus of the 8-bit module.

9. The device of claim 2 wherein said control circuit means comprises:

a twin-cycle byte exchange control unit means for driving the two byte exchange operations of a word exchange operation, performed by the 16-bit microprocessor;

a wait periods setting unit means for driving a wait periods setting output of the control circuit;

a data buffer control unit means for driving the data buffer register, the primary, the secondary and switching bidirectional data buffers; and an address circuit control unit means for driving the address modification circuit.

10. The device of claim 9 wherein said twin-cycle byte exchange control unit means comprises inputs connected to the twin-cycle byte exchange inputs of the control circuit.

11. The device of claim 9 wherein said wait periods setting unit means comprises an input connected to the wait control output of the twin-cycle byte exchange control unit and an output to the wait periods setting output of the control circuit.

12. The device of claim 9 wherein said data buffer control unit means comprises inputs connected to the buffer enable outputs of the twin-cycle exchange control unit, an input connected to the address control input of the control circuit and outputs connected to the data buffers control outputs of the control circuit.

13. The device of claim 9 wherein said address circuit control unit means comprises an input connected to the modification control output of the twin-cycle byte exchange control unit, an output connected to the address modification control output of the control circuit and an output connected to the address buffer control output of the control circuit.

* * * * *